United States Patent
Cassagne et al.

(10) Patent No.: US 10,319,369 B2
(45) Date of Patent: Jun. 11, 2019

(54) METHODS FOR THE AUTOMATED GENERATION OF SPEECH SAMPLE ASSET PRODUCTION SCORES FOR USERS OF A DISTRIBUTED LANGUAGE LEARNING SYSTEM, AUTOMATED ACCENT RECOGNITION AND QUANTIFICATION AND IMPROVED SPEECH RECOGNITION

(71) Applicant: VENDOME CONSULTING PTY LTD, Fisher, ACT (AU)

(72) Inventors: Gregory Cassagne, Fisher (AU); Philipp Schapotschnikow, Munich (DE)

(73) Assignee: VENDOME CONSULTING PTY LTD, Fisher (AU)

( * ) Notice: Subject to any disclaimer, the term of this patent is extended or adjusted under 35 U.S.C. 154(b) by 0 days.

(21) Appl. No.: 15/762,062

(22) PCT Filed: Sep. 22, 2016

(86) PCT No.: PCT/AU2016/050884
§ 371 (c)(1),
(2) Date: Mar. 21, 2018

(87) PCT Pub. No.: WO2017/049350
PCT Pub. Date: Mar. 30, 2017

(65) Prior Publication Data
US 2018/0277100 A1    Sep. 27, 2018

(30) Foreign Application Priority Data
Sep. 22, 2015 (AU) .................................. 2015903856

(51) Int. Cl.
*G10L 15/06* (2013.01)
*G06N 20/00* (2019.01)
(Continued)

(52) U.S. Cl.
CPC ............ *G10L 15/063* (2013.01); *G06N 20/00* (2019.01); *G09B 5/04* (2013.01); *G09B 19/04* (2013.01);
(Continued)

(58) Field of Classification Search
CPC ... G10L 15/063; G10L 15/005; G10L 15/142; G10L 15/16; G10L 15/22; G10L 25/60;
(Continued)

(56) References Cited

U.S. PATENT DOCUMENTS 6,055,498 A    4/2000  Neumeyer et al.
7,653,543 B1 * 1/2010  Blair ...................... G10L 17/26
                                                                    704/224

(Continued)

OTHER PUBLICATIONS

International Search Report & Written Opinion dated Dec. 14, 2016 from PCT Application No. PCT/AU2016/050884.

*Primary Examiner* — Mohammad K Islam
(74) *Attorney, Agent, or Firm* — Innovation Capital Law Group, LLP; Vic Lin

(57) ABSTRACT

Methods for automated generation of speech sample asset production scores for users of a distributed language learning system, automated accent recognition and quantification and improved speech recognition. Utilizing a trained supervised machine learning module which is trained utilizing a training set comprising a plurality of production speech sample asset recordings, associated production scores generated by system users performing perception exercises and user background information. The trained supervised machine learning module may be configured for automated accent recognition, by feeding a candidate production speech sample asset so as to automate the generation of a speech sample asset production score and user background information. As such, the user background information may be translated into an accent type categorization and the (Continued)

speech sample asset production score may be translated into an accent strength. In further embodiments, the accent type categorization generated using the trained system may be utilized for improved speech recognition.

15 Claims, 11 Drawing Sheets

(51) Int. Cl.
*G09B 5/04* (2006.01)
*G09B 19/06* (2006.01)
*G10L 15/00* (2013.01)
*G10L 25/60* (2013.01)
*G09B 19/04* (2006.01)
*G10L 15/14* (2006.01)
*G10L 15/16* (2006.01)
*G10L 15/22* (2006.01)
*G10L 15/32* (2013.01)

(52) U.S. Cl.
CPC .......... *G09B 19/06* (2013.01); *G10L 15/005* (2013.01); *G10L 15/142* (2013.01); *G10L 15/16* (2013.01); *G10L 15/22* (2013.01); *G10L 25/60* (2013.01); *G10L 15/32* (2013.01)

(58) Field of Classification Search
CPC .......... G10L 15/32; G06N 20/00; G09B 5/04; G09B 19/04; G09B 19/06
See application file for complete search history.

(56) References Cited

U.S. PATENT DOCUMENTS

| | | | |
|---|---|---|---|
| 9,129,605 B2* | 9/2015 | Eller | G10L 15/26 |
| 9,202,464 B1* | 12/2015 | Senior | G10L 15/063 |
| 2007/0033017 A1 | 2/2007 | Nair et al. | |
| 2008/0027725 A1 | 1/2008 | Chu et al. | |
| 2008/0177543 A1* | 7/2008 | Nagano | G10L 15/04 |
| | | | 704/253 |
| 2009/0171661 A1 | 7/2009 | Jayadeva et al. | |
| 2012/0164612 A1 | 6/2012 | Gillick et al. | |
| 2015/0339940 A1 | 11/2015 | Aggarwal et al. | |
| 2017/0270919 A1* | 9/2017 | Parthasarathi | G10L 15/20 |

* cited by examiner

METHODS FOR THE AUTOMATED GENERATION OF SPEECH SAMPLE ASSET PRODUCTION SCORES FOR USERS OF A DISTRIBUTED LANGUAGE LEARNING SYSTEM, AUTOMATED ACCENT RECOGNITION AND QUANTIFICATION AND IMPROVED SPEECH RECOGNITION

FIELD OF THE INVENTION

The present invention relates to methods for the automated generation of speech sample asset production scores for users of a distributed language learning system, automated accent recognition and quantification and improved speech recognition.

SUMMARY OF THE DISCLOSURE

In the embodiments provided herein, there is provided a method for the automated generation of speech sample asset production scores for users of a distributed language learning system. Specifically, the method may utilise a trained supervised machine learning module which is trained utilising a training set comprising a plurality of production speech sample asset recordings, associated production scores generated by system users performing perception exercises and user background information.

Once trained, the trained supervised machine learning module may be configured for automating the generation of speech sample asset production scores when provided with a candidate production speech sample asset recording and user background information.

In further embodiments, the trained supervised machine learning module may be configured for automated accent recognition. Specifically, the trained supervised machine learning module may be fed a candidate production speech sample asset so as to automate the generation of a speech sample asset production score and user background information.

As such, the user background information may be translated into an accent type categorisation and the speech sample asset production score may be translated into an accent strength.

In further embodiments, the accent type categorisation generated using the trained system may be utilised for improved speech recognition wherein the accent type categorisation is utilised for the purposes of selecting an appropriate acoustic model for a speech recognition module.

As such, with the foregoing in mind, in accordance with a first aspect, there is provided a method for the automated generation of speech sample asset production scores for users of a distributed language learning system, the method comprising: for a plurality of speech sample assets comprising native speech sample assets; sending the native speech sample assets to a plurality of non-native speaker users to perform production exercises; receiving production speech sample assets generated by the production exercises; sending the production speech sample assets to a plurality of users to perform perception exercises; receiving production scores generated by the perception exercises; training a supervised machine learning module comprising: generating a training set comprising the production speech sample assets and the associated production scores and associated user background information of the first plurality of non-native speaker users; training the supervised machine learning module utilising the training set to generate a trained supervised machine learning module; and for a candidate production speech sample asset of a non-native speaker user, inputting the candidate production speech sample asset and user background information of the non-native speaker user into the trained supervised machine learning module to automate the generation of a speech sample asset production score for the candidate production speech sample asset.

The method may further comprise stretching the production scores to reduce rating drift.

The method may further comprise calculating perception scores in accordance with the production scores.

The perception score represents accuracy.

The perception score represents consistency.

The production exercises may comprise an emulation production exercise.

The emulation production exercises may comprise a word emulation production exercise.

The emulation production exercises may comprise a sentence emulation production exercise.

The production exercises may comprise a comprehension exercise.

The perception exercises may comprise rating the recorded speech sample in accordance with a feedback scale.

The feedback scale may be a numeric rating scale.

The feedback scale may be a categorised rating scale.

The production scores may comprise production scores relating to a plurality of metrics.

The perception exercises may comprise comparing the production speech sample assets with other speech sample assets.

Calculating the perception score may comprise comparing the production score with at least one other production score for a production speech sample asset for a user.

Calculating the perception score may comprise utilising a statistical technique.

The statistical technique may comprise bell curve fitting.

User background information may comprise at least one of native language, country of origin and country of residence.

The method may be further for automated accent recognition and quantification, the method comprising: inputting the candidate production speech sample asset into the trained supervised machine learning module to generate: the speech sample asset production score; and user background information of the non-native speaker user; translating the user background information into an accent type category; and translating the speech sample asset production score to an accent strength.

The trained supervised machine learning module may use regression for the generation of the speech sample asset production score.

The trained supervised machine learning module may use classification for the generation of the user background information.

The user background information may comprise at least one of native language, country of origin and country of residence.

The method may further be for improved speech recognition, the method comprising for a speech recognition module, selecting an acoustic model in accordance with the accent type category.

The method may further comprise, for the speech recognition module, selecting and combining a plurality of acoustic models in accordance with the accent type and strength.

The speech recognition module may be a Hidden Markov Model speech recognition module.

The method may further be for improved speech recognition, the method comprising: for a speech recognition module, training the speech recognition module in accordance with the accent type category and the candidate production speech sample asset.

The speech recognition module may be an artificial neural network speech recognition module.

The method may further be for improved speech recognition the method comprising: training a plurality of speech recognition modules in accordance with a respective plurality of accents and selecting one of the plurality of speech recognition modules in accordance with the accent type category.

The speech recognition module may be an artificial neural network speech recognition module.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
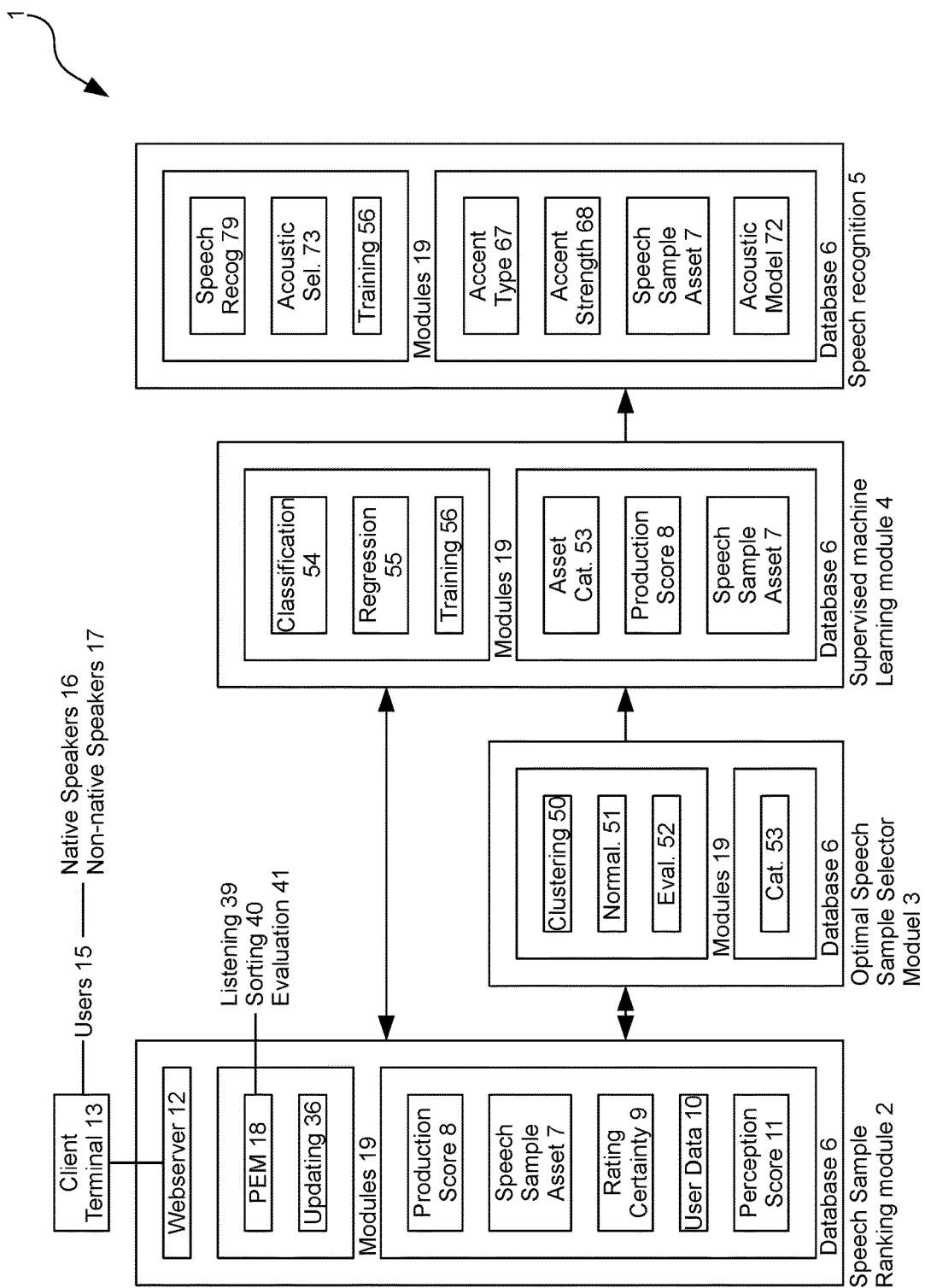
FIG. 1 shows for the automated generation of speech sample asset production scores for users of a distributed language learning system, automated accent recognition and quantification and improved speech recognition in accordance with an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the methods for the automated generation of speech sample asset production scores for users of a distributed language learning system, automated accent recognition and quantification and improved speech recognition are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Overview

In the embodiments that follow, there will be described a system 1 for improving automatic speech recognition for non-native speakers.

Specifically, turning to FIG. 1 there is shown the system 1 comprising which may four primary functional modules or a subset thereof.

Specifically, and as will be described in further detail below, the system 1 comprises a speech sample asset ranking module 2 configured for ranking speech sample assets. The module 2 may also be referred to as a distributed language learning system 2 in that users 15 utilise the system 2 to perform production and perception exercises such that the system 2 is able to generate production scores 8 for the plurality of speech sample assets 7 and perception scores 11 for the plurality of system users 15.

In embodiments, the system 1 may further comprise an optimal speech sample asset selection module 3 configured for selecting optimal speech sample assets in accordance with the rankings derived from the speech sample asset ranking module 2.

Furthermore, the system 1 comprises a supervised machine learning module 4. In embodiments, the supervised machine learning module 4 may be configured for the automated generation of the production scores 8. Furthermore, in embodiments, the supervised machine learning module 4 may be configured for the automated generation of accent type classifications and accent strength. In embodiments, the supervised machine learning module 4 would be trained using the speech sample assets 7 and the production scores 8 generated by the speech sample ranking module 2. The the supervised machine learning module 4 may also be trained on user background information in this embodiment. As can be seen from FIG. 1, in embodiments, the supervised machine learning module 4 may additionally or alternatively be trained utilising optimal speech sample assets selected or by the optimal speech sample asset selection module 3.

Thereafter, the system 1 comprises a speech recognition module 5 configured for performing speech recognition wherein the speech recognition is improved by taking into account the differing accent classifications determined by the supervised machine learning module 4 wherein, specifically, differing acoustic models are utilised in accordance with the accent and strength of the speech sample asset detected by the supervised machine learning module 4.

It should be noted that the terminology "module" should not be construed as being limited to a particular technical implementation and may encompass differing technical implementations within the purpose of scope of the embodiments described herein. For example, the various modules described herein may each be performed by computer program code comprising the relevant software modules been executed by a single or distributed computing system.

Furthermore, it should be noted that the differing modules of FIG. 1 are represented separately primarily for illustrative convenience to demarcate the functionality of each module. However, in embodiments, such modules may be implemented by the same or different computer devices, and the databases may be shared or disparate.

Speech Sample Asset Ranking Module.

As will be described in further detail below, the speech sample asset ranking module 2 is configured for user evaluation of speech sample assets and allocating rankings.

In an embodiment, the speech sample asset ranking module 2 is configured for incremental updating of the rankings in accordance with certain events including those which are described herein.

Now, the speech sample asset ranking module 2 may comprise a database 6 configured for storing the various requisite data described herein.

Specifically, the database 6 may be configured for storing speech sample assets 7 representing various speech sample assets obtained from users utilising the speech sample asset ranking module 2.

Specifically, in embodiments, the speech sample asset ranking module 2 may implement a web server 12 configured to serve HTTP requests across the Internet.

In this manner, users 15, such as comprising non-native speakers 17 and native speakers 16 utilise client terminals 13 for the purposes of interacting with the web server 12 for performing the various functionality described herein, including partaking in production exercises wherein speech sample assets are generated and perception exercises wherein speech sample assets 7 are rated. In embodiments, the user 15 may comprise teacher or expert users, generally being native speakers and student users, which may comprise a mix of native and non-native speakers 17.

Now, referring to the database 6, as can be seen, the speech sample assets 7 may be allocated various ratings. Specifically, as shown, each speech sample asset 7 may be associated with a production score 8 and a rating certainty 9.

In general terms, the production score 8 indicates how well the speech sample asset 7 was pronounced by a user 15. In embodiments, the speech sample asset ranking module 2 may display the production score 8 to the associated user 15 via the client terminal 13. In the embodiment described herein, the rating score comprises a number from 0 to 100.

Furthermore, each speech sample asset 7 has an associated rating certainty 9. In general terms, the rating certainty indicates the certainty of the production score 8 and, in the illustrated embodiment provided, may comprise a number from 0 to 100.

As can also be seen, user data 10 is also stored within the database 6 representing the various users 15 of the speech sample asset ranking module 2. In embodiments, the user data 10 may additionally comprise user background information such as country of origin and residence, native language and the like. Such may be used for training the supervised machine learning module 4 in embodiments as will be described in further detail below.

As can be seen, for each entry of the user data 10, there may also be allocated a perception score 11. In general terms, perception score describes the quality of the rankings generated by the user 15. Again, the perception score may comprise a number between 0 and 100.

Now, during the initial registration process, users may indicate whether or not the user is a native speaker 16 or a non-native speaker 17 for the particular language of the speech sample asset ranking module 2.

Now, for speech sample assets 7 generated by native speakers 16, the speech sample asset ranking module 2 may allocate high production scores 8 and rating certainties 9. Furthermore, high perception scores 11 may be initially allocated to native speakers 16.

Rating Initialisation

For non-native speakers 17, the production score 8 may initially be set during a first comparison exercise involving the relevant speech sample asset 7. In embodiments, the production score 8 may be initialised by the supervised machine learning module 4 described in further detail below.

Specifically, as can be seen, the speech sample asset ranking module 2 may comprise a plurality of software modules 6 configured for implementing the various functionality described herein. In this regard, the software modules 19 may comprise a comparison exercise module 18 configured for implementing various comparison exercises for completion by users 15 utilising the client terminal 13 including a perception exercise wherein speech sample assets 7 are played out via the client terminal 13 for perception exercises by users 15. Based on the outcome of the perception exercise implemented by the perception exercise module 18, the initial production score 8 may be set.

Furthermore, the initial rating certainty 9 for a speech sample asset 9 may be set to 0.

Furthermore, in embodiments, the initial perception score 11 for a user 15 may be set midway, such as at 50.

Conversely, for users comprising native speakers 16, the initialisation may comprise allocating an initial high production score 8 for the relevant speech sample asset 7 such as, for example, in embodiments, 95. Furthermore, a high rating certainty 9 may be allocated also, such as 95.

Additionally, initial high perception scores 11 may be allocated wherein, for example, teacher or expert users 15 are allocated a very high perception score 11 of, for example 90 whereas other native speakers 16 are allocated a less high perception score 11 of, for example 70.

Comparison Event

Now, the ratings 8, 9 and the perception scores 11 are updated at certain events. Specifically, one such event comprises a comparison event implemented by the comparison exercise module 18.

Specifically, the comparison events implemented by the comparison exercise module 8 may comprise a number of comparison exercises.

In accordance with one embodiment, the comparison exercise module 18 implements a perception exercise 39 wherein a user, utilising the client terminal 13 listens to a number of speech sample assets 7 and ranks the speech sample assets in accordance with the perceived pronunciation accuracy. In a preferred embodiment, the comparison comprises a pairwise comparison wherein a pair of speech sample assets 7 is presented to the user and wherein the user selects the speech sample asset 7 perceived by the user as being the most accurately pronounced.

In a further embodiment, the comparison exercise module 18 may implement a sorting exercise 40 wherein the client terminal 13 presents a number of speech sample assets 7 to the user 15 wherein the user 15 has to input which of the presented speech sample assets 7 have been produced by native speakers and those which have not. Alternatively, in another embodiment, the user 15 would be required to independently rank each speech sample asset 7. In embodiments, the sorting exercise may utilise a reference native speaker against which the plurality of other speech sample assets 7 compared. In this regard, the rating of the reference native speaker is unchanged.

The comparison exercise module 18 may further comprise an evaluation exercise 41 wherein a native speaker 17 is able to assign rating scores to a speech sample asset 7. As will be described in further detail below, the native speaker 16 or expert user 15 assignment is stored and may be utilised during rating stretching is as described in further detail below. Note that such evaluation by the native speaker 16 or the expert user 15 is preferably utilised rarely when resolving specific problems including for optimal selection of assets for perception exercises as is described in further detail below.

Method for Comparing Assets

Figure 2:
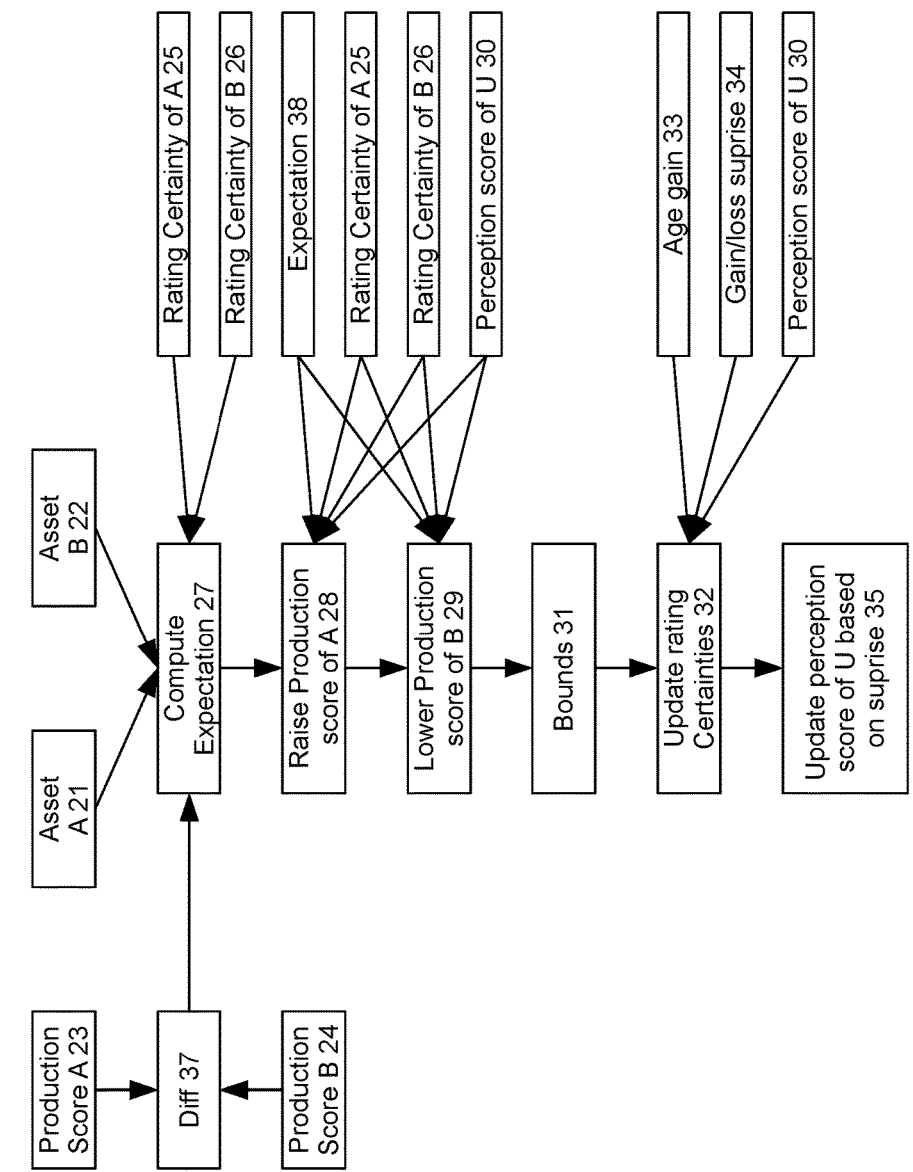
FIG. 2 shows an exemplary method for comparing two speech sample assets in accordance with an embodiment of the present disclosure.

Turning now to FIG. 2, there is shown an exemplary method 20 for comparing two speech sample assets 7, given in the example as Asset A 21 and Asset B 22.

Specifically, as can be seen from the software modules 19 of the speech sample asset ranking module 2, the software modules 19 may comprise a score updating module 36 which is configured to update the production score 8, rating certainty 9 and perception score 10 in accordance with the outcome of a perception exercise implemented by the perception exercise module 18.

Specifically, the perception exercise module 18 would present via the client terminal 13, both Asset A 21 and Asset B 22 for comparison by the user. Such an exercise may involve the user perception of both speech sample assets 7 and selecting the speech sample asset 7 judged by the user as being most accurately pronounced.

As such, the exemplary method 20 comprises a first step 27 wherein an expectation is computed. Specifically, the expectation is the probability that Asset A 21 is ranked higher than Asset B 22. For example, the expectation may be a number between 0 and 1 and may be a function of the difference 37 between the rating scores of Assets A and B. The higher difference, the higher the expectation. If the difference is 0, the expectation is 0.5. The expectation is further a function of the rating certainty of Asset A 25 and rating certainty of Asset B 26.

The method 20 comprises a further step 2 wherein the "surprise" metric is computed. In this environment, the surprise equals the outcome less the expectation computed in step 27. The outcome is 1 if A is ranked higher than B, and 0 if A is ranked lower than B. In this regard, the surprise may be negative.

Then, at step 28, if Asset A 21 has been ranked higher than Asset B 22, the rating score of Asset A 21 is raised according to the computed expectation 38 wherein the lower the expectation 38, the higher the increase. The rating score of Asset A 21 is further raised in accordance with the rating certainty of Asset A 25 wherein the higher the certainty, the lower the increase. Conversely, the production score of Asset A 23 is further raised in accordance with the rating certainty of Asset B 26 wherein the higher the certainty, the higher the increase. Furthermore, the production score of Asset A 23 is further raised in accordance with the perception score of the user 30 wherein the higher the perception score 30, the larger the increase.

At step 29, again if Asset A 21 has been ranked higher than Asset B 22, the rating score of Asset B 22 is conversely lowered in accordance with the expectation 38, rating certainty of Asset A 25, rating certainty of Asset B 26 and the perception score of 30. It should be noted that in lowering the rating score of Asset B 22, the higher the rating certainty of Asset A 25, the larger the decrease and the higher the rating certainty of Asset B 26, the larger the decrease.

Step 31, the updated rating scores 23 24 are bound checked.

At step 32, the rating certainties 9 of Asset A 21 and Asset B 22 are updated. The rating certainties 9 may be updated in accordance with an age gain 33 which depends on the current certainty.

Specifically, the larger the current certainty, the lower the age gain 33. Furthermore, the rating certainties 9 are updated in accordance with the gain or loss based on the surprise. In this regard, the larger the surprise, the larger the loss. Furthermore, the rating certainties 9 are updated in accordance with the perception score of the user wherein the better the score, the larger the change.

Finally, at step 35, the perception score 11 of the user is updated according to the surprise.

Rating Stretching

In embodiments, the speech sample asset ranking module 2 is configured for rating stretching. Rating stretching is important to accumulate differing rating score set by different native speakers 16 for differing speech sample assets 7.

Furthermore, rating stretching may be utilised to normalise production scores 8 of differing speech sample assets 7 describing the same word so as to limit possible rating drifts. In this embodiment, rating stretching is performed across the entire set of speech sample assets 7 for the same word. In this regard, the rating stretching algorithm is a function that adjusts the individual rating scores. The stretching algorithm is designed to satisfy a first condition comprising monotonicity wherein if an Asset A 21 has a higher score than Asset B 22 before stretching, the rating score of Asset A 23 must not be lower than the rating score of Asset B 24 after stretching.

Furthermore, the stretching algorithm further satisfies the further condition of teacher score fidelity wherein if Asset A 21 has been allocated a score S by a native speaker 17, then the rating score of Asset A 23 after the stretching minus the allocated score S is computed as the local error. In this regard, a global error is calculated as the weighted combination of the local errors. In this regard, the stretching algorithm seeks to minimise the global error.

Furthermore, in embodiments, after rating stretching has been implement, the speech sample assets 7 which have been evaluated by native speakers 16 are identified and wherein, for these identified speech sample assets 7, the difference between the new rating score after stretching and the score given by the native-speaker 17 is computed as the local error. As such, for these identified speech sample assets, the rating certainty 9 of the asset is increased wherein the smaller the local error, the larger the increase of the rating certainty 9. Furthermore, the perception score 11 of the native speaker 17 is updated in accordance with the local error calculated.

Exemplary Use Case Scenario

Figure 3:
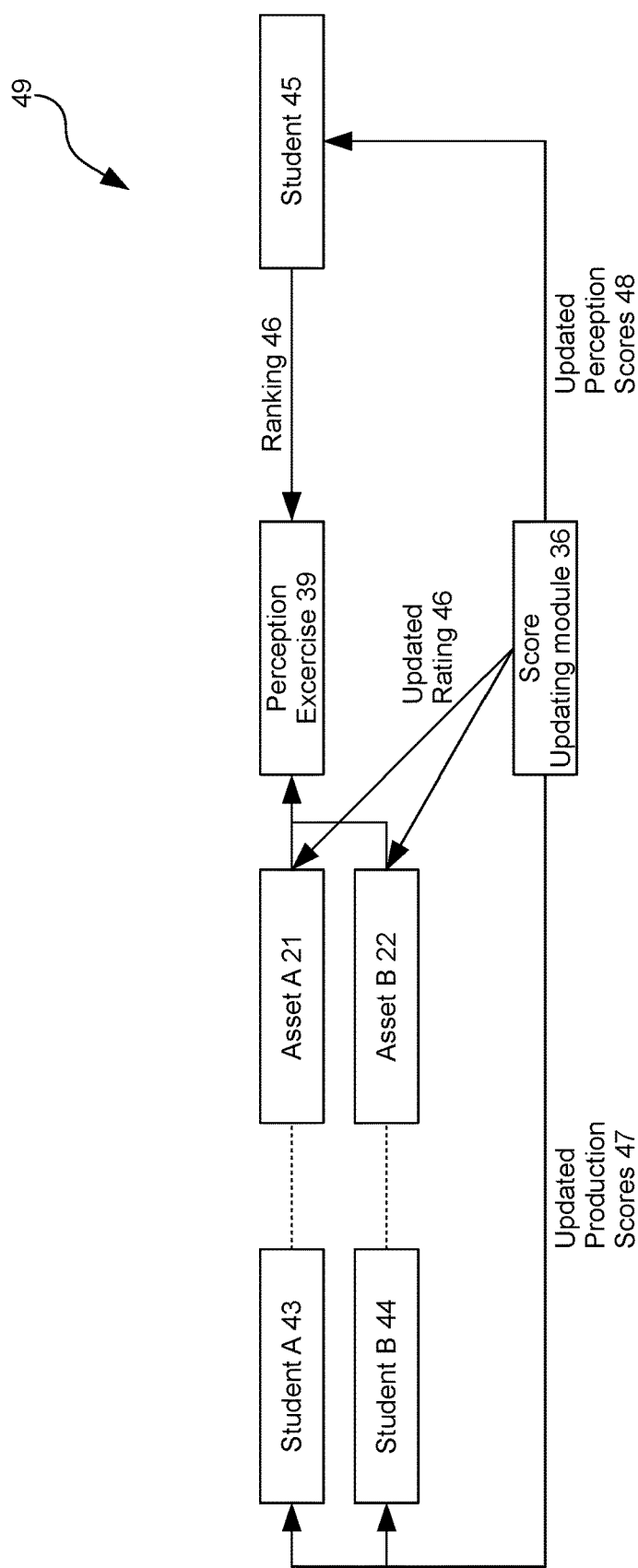
FIG. 3 shows an exemplary use case scenario implemented by the speech sample asset ranking module in accordance with an embodiment of the present disclosure.

Turning now to FIG. 3, there is shown an exemplary use case scenario 49 implemented by the speech sample asset ranking module 2. In the exemplary scenario 9 there is shown user 15 A 43 and user 15 B 44 having generated respective of associated Assets A 21 and B 22.

As such, in the scenario 49, the perception exercise 39 is implemented by the perception exercise module 39 wherein a user 45 ranks 46 Asset A 21 and Asset B 22.

Having performed the perception exercise 39, the production score update module 36 updates the various ratings, certainties and scores. Specifically, as can be seen, the rating score update module 36 updates the rating scores 8 with updated production scores 46 for Assets A 21 and Asset B 22.

Furthermore, the production score update module 36 updates the perception score 11 with an updated perception score 48 for the user 15 45 which performed the perception exercise.

Mathematical Models

Consider an asset A with rating score $S_A$ and rating certainty $C_A$. It is assumed that The (actual) rating score is a random variable with some probability distribution P(A) depending on $S_A$ and $C_A$. I is then assumed that the mean of the distribution only depends on $S_A$ (and is equal to $S_A$), and the variance V only depends on $C_A$. The dependence of V on $C_A$ is inverse: With increasing certainty, the variance ("uncertainty") decreases.

There are several possibilities to choose a distribution model (family). Here, only the normal distribution (bell-shape) will be discussed. The distribution is denoted by $N(S_A, V(C_A))$: Normal distribution with mean $S_A$, and variance V depending (only) on $C_A$. For simplicity, we can assume that $V=(100-C_A)^2$ Mathematical Models—Comparison: Expectation and Update When comparing two assets A and B, the expectation of A being ranked higher than B is the probability, that the random variable A is larger than the random variable B. For normally distributed variables, the explicit expression therefore is:

$$P(A > B) = \frac{1}{2}\left[1 + \text{erf}\left(\frac{S_A - S_B}{2(V(C_A) + V(C_B))}\right)\right] \quad (0.1)$$

The major properties of this formula are:
a. If the rating score of A is larger than that of B, the expectation is larger than 0.5; otherwise it is less than 0.5
b. The expectation is "symmetric": P(B>A)=1−P(A,B).
c. The expectation is bound to the range [0,1]
d. The expectation increases with the difference between the rating scores
e. The expectation gets closer to 0.5 with increasing uncertainty in any of the ratings In practice, another formula is used instead of (0.1), based on the logistic function:

$$P(A > B) = \frac{1}{1 + 10^{-K(S_A - S_B)}} \quad (0.2)$$

This formula has one additional positive parameter (K), which is either a constant, or a function of rating uncertainties. The formula (0.2) automatically shares the first 4 properties of (0.1); and the fifth if K is chosen appropriately.

Figure 4:
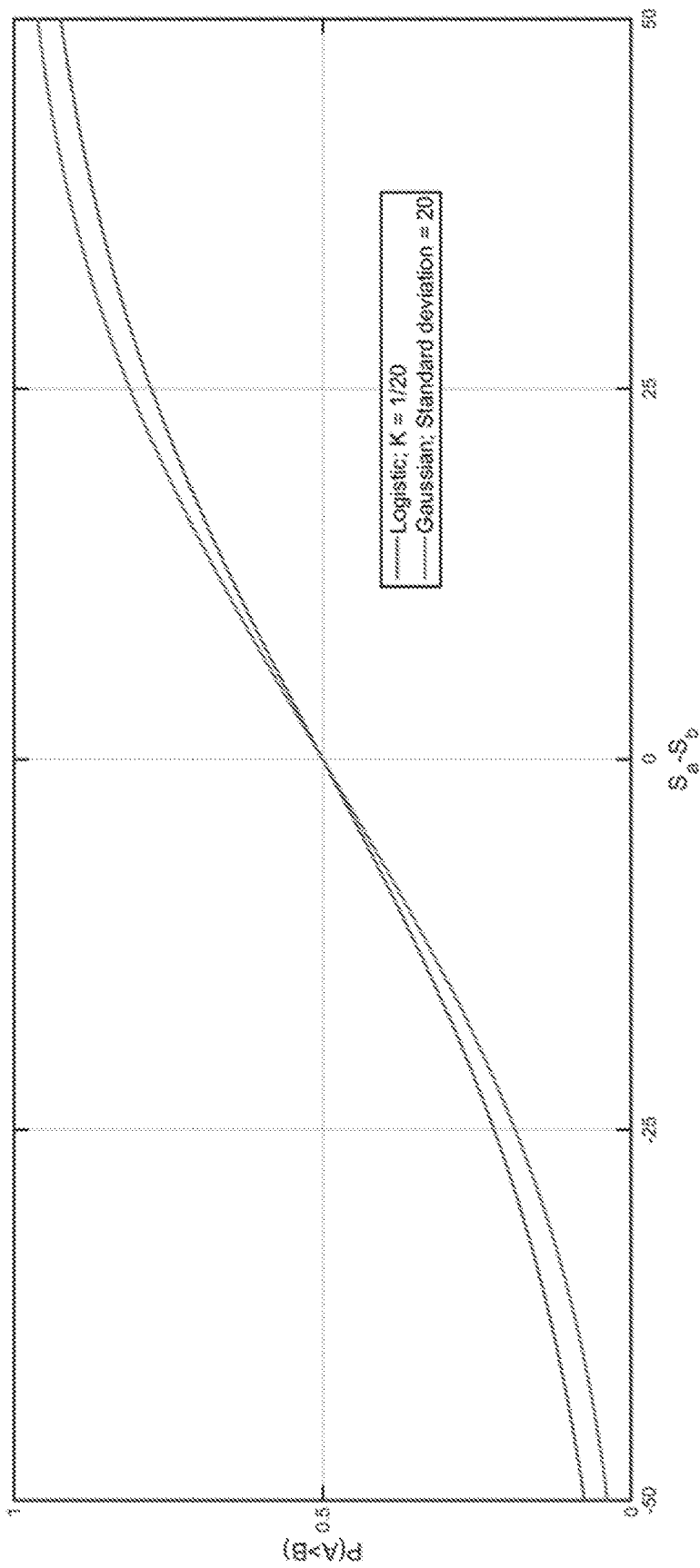
FIG. 4 shows expectation as function of the rating score difference between assets A and B in accordance with an embodiment of the present disclosure.

FIG. 4 shows expectation as function of the rating score difference between assets A and B.

The rating update is carried out as follows. Consider an event, where the asset A has been compared to assets $B_1$, $B_1, \ldots, B_n$. For example, in a perception exercise. Then the rating score is updated according to the following general formula:

$$S_a^{NEW} = S_a^{OLD} + M_a * L * \sum_{i=1}^{n} U_i(r_i - P(A > B_i)) \quad (0.3)$$

Here, the variables are:
a. $r_i$ The comparison result: 0 if A is ranked lower than $B_i$, 1 otherwise
b. $U_i$ The update weight factor, depending on asset $B_i$
c. $M_a$ The update weight factor, depending on asset A
d. L The update weight factor, depending on the perception score of the user 15 performing the perception exercise If is it assumed that the rating certainty is 100 minus the rating standard deviation, the updated formula can be used where the standard deviation id called rating deviation (RD).

To update the listener score, formula (0.3) can be used again. Instead of summing over all comparisons on one asset, we sum over all comparisons done by the user 15, and the update shall not depend on the asset:

$$L_u^{NEW} = L_u^{OLD} + W \sum_{\substack{i,j=1 \\ i \neq j}}^{n} (r_{i,j} - P(B_i > B_j)) \quad (0.4)$$

The parameter W can be chosen using appropriated heuristics, for example similar to the ELO system [1].

Mathematical Models—Rating Stretching

Rating stretching can be realized using piecewise-linear function (PLF). A PLF is defined by a set of support point $\{(x_1,y_1), (x_2,y_2), \ldots, (x_N,y_N)\}$ where N is the number of support points and $x_1 < x_2 < \ldots < x_N$. The value of the function is then $$PLF(x) = \begin{cases} y_1 & \text{for } x < x_1 \\ y_i + \frac{y_{i+1} - y_i}{x_{i+1} - x_i}(x - x_x) & \text{for } x_i \leq x < x_{i+1} \\ y_N & \text{for } x \geq x_N \end{cases} \quad (0.5)$$

In this case, x is the rating score before stretching; y is the rating score after stretching. Obviously, $x_1 = y_1 = 0$; $x_N = y_N = 100$. A convenient choice of N would be the number of categories; the $x_i$ for 0<i<N would then be the category boundaries. The remaining degrees of freedom are the $y_i$. Due to the monotonicity condition, we have $y_1 < y_2 < \ldots < y_N$. The y's can be chosen to minimize the global error $$Err(PLF) = \sum_{evaluated} w_i(PLF(S_i) - S_i^{EV})^2 \quad (0.6)$$

where $w_i$ is the weight proportional to the evaluator's perception score; $S_i$ is the current score and $S_i^{EV}$ is the evaluated score. Together with the monotonicity condition, the minimization of the error is a quadratic programming problem, for which off-the-shelf methods exist.

Figure 5:
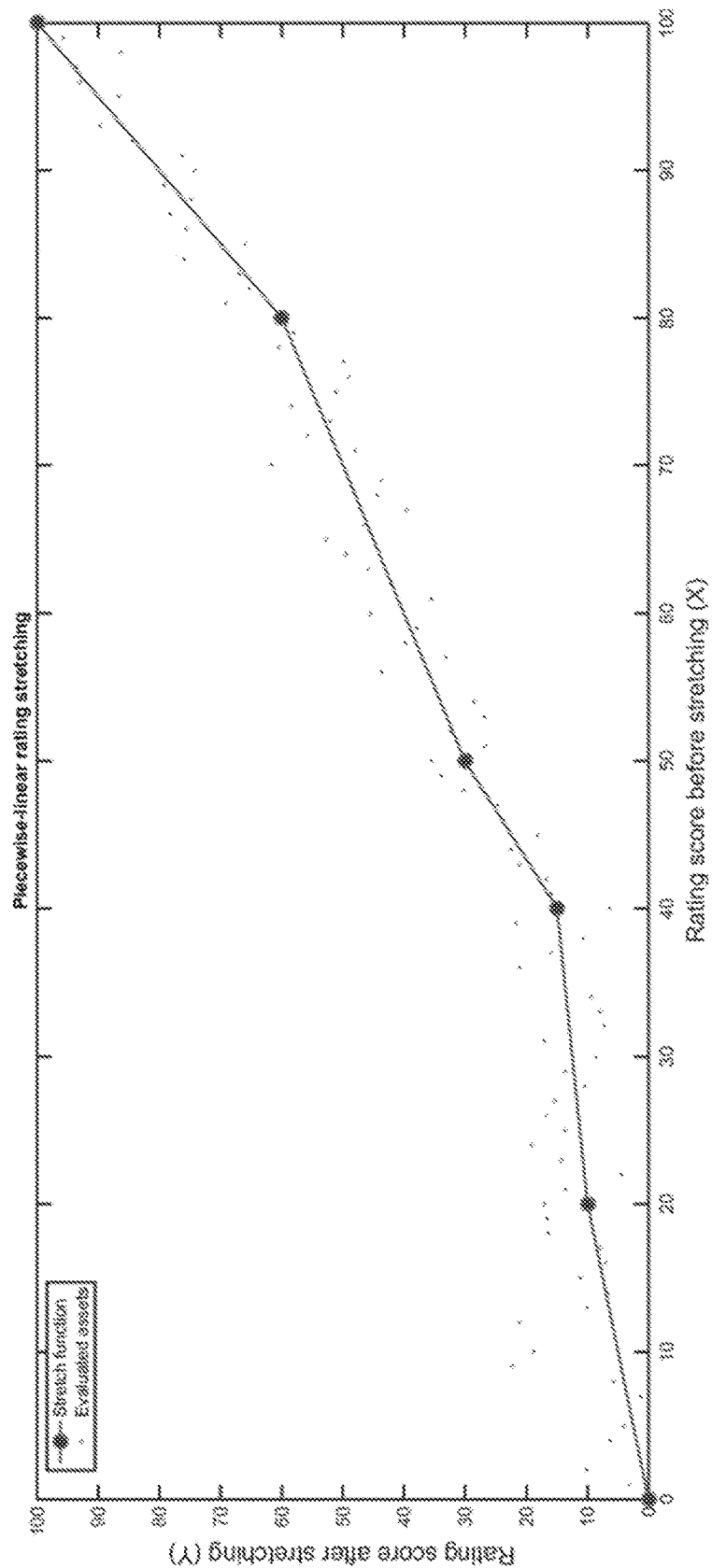
FIG. 5 shows rating stretching using a piecewise linear function with 5 pieces, fitted to evaluated assets in accordance with an embodiment of the present disclosure.

FIG. 5 shows rating stretching using a piecewise linear function with 5 pieces, fitted to evaluated assets.

Optimal Selection of Speech Sample Assets

Turning again to FIG. 1, as can be seen, the system 1, in embodiments, further comprises an optimal speech sample asset selection module 3 configured for the optimal selection of a speech sample assets 7.

In general terms, the selection module 3 will divide the speech sample assets 7 into M categories in accordance with the associated relevant production score 8. These categories represent the differing proficiency levels of the users 15 such as "beginner", "advanced", "expert", "native speaker" or the like. Other categories may be used wherein the optimal subdivision thereof is described in further detail below.

Now, in general terms, during a perception exercise in 39, a user 15 compares and ranks N speech sample assets 7. As such, the optimal speech sample asset selection module 3 is configured to select N speech sample assets 7 from which the most amount of information may be gathered from the comparison for the purposes of the categorised subdivision.

In this regard, the speech sample assets 7 utilised may comprise a mix of assets 7 comprising both high and low rating certainty scores 8. As such, each category is assigned a production score 8 benchmark, being the average production score 8 or rating score range for each category. Furthermore, the benchmark for each category is distinct. Furthermore, no speech sample assets 7 should be compared more than once.

As such, when performing the categorisation, the optimal speech sample asset selection module 3 may implement a categorisation algorithm wherein, for the perception exercises 39 selected for utilisation, there is at least one low-certainty asset 7. Furthermore, for each low certainty asset 7, there is at least lower or higher benchmark. As such, if the low certainty asset 7 belongs to the lowest or highest category, then the benchmark from the same category is taken.

Now, in a particular embodiment, the selection module 3 is configured for the optimal selection of speech sample assets 7 substantially autonomously. However, in certain rare cases, additional perception exercises performed by native speakers may be required to resolve specific problems or to create specific reference points for the selection 13.

Two potential scenarios may be required wherein a native speaker 17 is asked for an allocation via the client terminal 13 on a speech sample asset 7 wherein a native speaker expert evaluation is required for the above described rating stretching or where users 15 cannot agree on the production score 8.

Such additional perception exercises performed by native speakers 16 or expert users 15 may be required in first scenario if 1) there is no marked user 15 in a category, 2) all expert evaluated users 15 in a category are too far away from the category centre, or 3) the rating score of the expert-evaluated users 15 close to the category centre is too far from the actual rating scores. Furthermore, such manual intervention may be required for a second scenario wherein a user 15 has a too low rating certainty for the number of comparison events.

Now, in further detail, the selection module 3 utilises a plurality of software modules 19 for the optimal speech sample asset 7 selection.

As can be seen, the software modules 19 of the selection module 3 may comprise a clustering module 50 wherein the speech sample assets 7 relating to the same word are split into the predefined number of categories.

Specifically, as can be seen, the selection module 3 may further comprise a database 6 comprising the categories 53 which have been assigned to the various speech sample assets 7. As such, the clustering module 50 is configured for allocating the speech sample assets 7 to the associated categories 53 within the database. In embodiments, the clustering module 15 implements a one-dimensional clustering which may involve minimising the total intra-cluster variance.

Once clustering has been performed, a normalisation module 51 may be utilised wherein, a category centre is defined as the mean of the associated assets within the category 53 such that the normalisation module 51 is configured for normalising the distances of the speech sample assets 7 from the category centre utilising a standard deviation. The distance from the category centre may be referred to as the Z-score.

Furthermore, the software modules 19 of the selection module 3 further comprise a selection for evaluation module 52 configured for selecting those speech sample assets 7 for native speaker evaluation in the rare instances.

In selecting the speech sample assets 7 for expert evaluation, the evaluation module 52 may implement a priority comprising a first priority wherein assets from categories are selected if there is no evaluated user 15 in the particular category. Such a selection will (indirectly) influence all of the other assets 7 during the above described rating stretching.

Furthermore, the evaluation module 52 may select those assets 7 having a threshold minimum number of comparisons and which have a low rating certainty 9. The threshold for the low rating certainty may be adjusted depending on the module utilised. For example, once initialised, a statistical module may be utilised wherein the module predicts that, after N comparisons, an asset 7 should have a certainty C with an error margin of M. Such, the "badness" of an asset is measured as the ratio of the expected certainty less the asset certainty and the error margin of expectation.

The evaluation module 52 may then further select those categories devoid of speech sample assets 7 close to category centres as is measured by the Z-score.

Finally, the evaluation module 52 may select random samples for evaluation.

Supervised Machine Learning for Asset Evaluation

Turning again to FIG. 1, as can be further seen, the system 1 may comprise a supervised machine learning module 4 for asset evaluation.

Now, supervised machine learning is a framework, where the performance of a computer program on a certain task improves with the amount of instances of the task with solutions supplied to the program. The set of supplied instances with solution is called training set.

There are two fundamental mechanisms for "learning" how to solve a problem comprising 1) analogy wherein a similar problem is identified in the training set and the associated solution is adapted and 2) abstraction wherein, using the training data, a set of rules is derived, which lead to the associated solutions. The quality of abstraction is measured by the ability of the program to solve new tasks.

When working with machine learning tasks, one has to address problem formulation. In this context, two common formulations are relevant:

a. Classification: Given the input data and a discrete set of categories, determine, to which category the asset belongs.

b. Regression: Given the input data, determine a number or a set of numbers.

Consider for example weather prediction. Predicting the type of weather (sunny, cloudy, rain, snow, fog, . . . ) is a classification task. Predicting the temperature, air humidity, amount of precipitation is a regression task.

One of the major issues in machine learning is the representation of a problem: How to represent the input data. The raw input data is usually not suited: The amount of information is overwhelmingly large compared to the amount of relevant information. Therefore, the raw data is processed into a set of features. This feature vector then serves as input to the framework. However, the problem of identifying relevant features remains.

An alternative to the manual feature definition is the emerging field of representation learning. A system is supplied with raw data, and its goal is not only to learn how to solve a problem, but also how to represent the input data in a solution-oriented way. The most common and increasingly popular approach called Deep Learning is based on artificial neural networks (ANN).

Application of the Supervised Machine Learning Module 4 for Speech Sample Asset Rating There will now be described specifically the use of the supervised machine learning module 4 for asset evaluation. In this embodiment, the raw input data is a speech sample asset 7 and the output is the production score 8 and/or category. The training set is the database of assets 7 with known rating 8. Ideally, only assets with high certainty should be taken into the training set.

Specifically, as can be seen, the machine learning module 4 may similarly comprise a plurality of software modules 6 and a database 9. As can be seen, the software modules 6 may comprise a classification module 54 configured to determine the asset category 53 (inferring the accent type classification as will be described in further detail below) for storage in the database 19.

Furthermore, the machine learning module 4 may comprise a regression module 55 configured to determine the production score 8 for storage in the database 19 (inferring an accent strength as will be described in further detail below).

Furthermore, the modules 6 may comprise a training module 56 for optimising the classification module 54 and regression module 55. The input for the training module 54 may be only those speech sample assets 7 having a known production score 8. Furthermore, ideally, only those speech sample assets 7 having a rating certainty 9 exceeding a threshold are utilised.

Now, the representation of the input data may utilise automated accent recognition. For example, in one embodiment, the mel-frequency cepstral coefficients (MFCC) representation may be applied to the input speech sample assets 7. Alternatively, a deep learning approach may be utilised to represent the input data. It is well possible that the MFCC features will emerge among the learnt representations; it is hence not correct to consider the two approaches competing or mutually exclusive.

Use Case Scenario: Supervised Machine Learning for Autonomous Accent Recognition and Quantification Using User Ratings Turning now to FIG. 6, there is shown in exemplary use case scenario of utilising the supervised machine learning module 4 for autonomous accent recognition and quantification utilising the rating scores 8.

Initially, the supervised machine learning module 4 is trained utilising training module 56. Specifically, the module 4 is trained utilising complete data units 58 which may comprise the speech sample asset 7 and the rating scores 8 for the speech sample assets 7. Ideally, only those speech sample assets 7 having a higher rating certainty 9 are utilised for training purposes.

Furthermore, user background information 80 may be utilised. Various user background information 80 may be utilised including the users 15 first language, country of origin if provided, country of residence if provided and the like.

As can be seen, the plurality of complete data units 58 constitute a training set 57 which are then fed into training module 56 to train the classification 54 and regression 55 modules of the supervised machine learning module 4.

Use Case: Applying the Trained System 4 for Automated Generation of Speech Sample Asset Production Scores Turning now to FIG. 7, having trained the supervised machine learning module 4 in the manner described above there is shown in exemplary use case scenario 63 wherein the trained supervised machine learning module 4 is utilised to predict the rating 8 of a speech sample asset 7.

Specifically, as is shown, for a particular user 15, the user background 80 and the speech sample asset 7 are fed into the trained supervised machine learning module 4 such that the production score 8 is output from the trained system 4 which may be utilised as feedback for the user 15.

Figure 8:
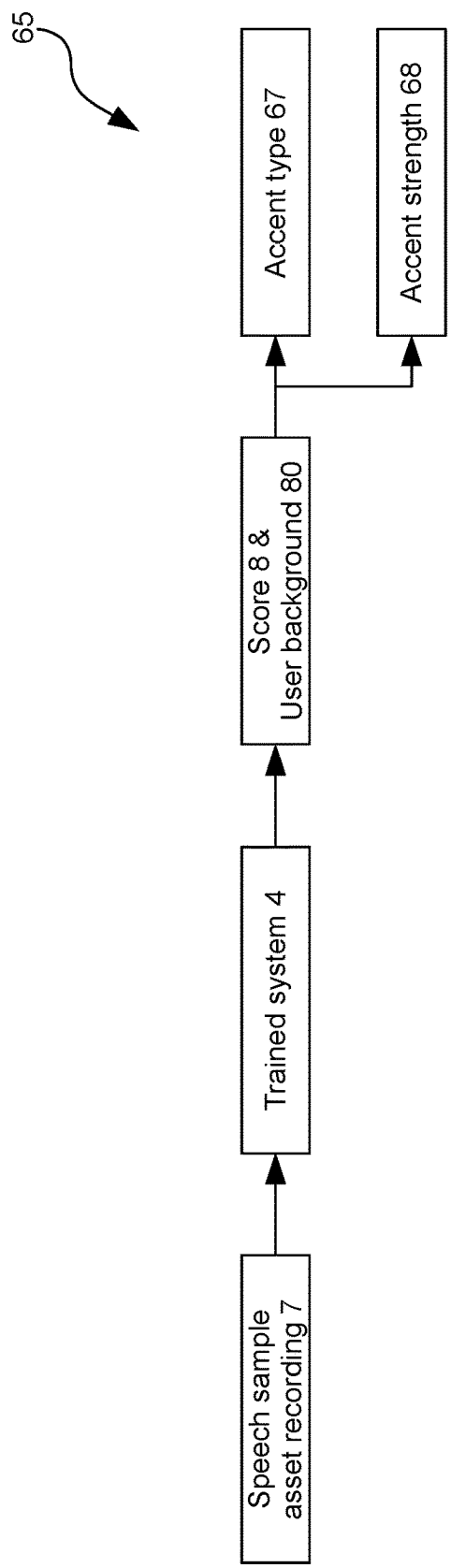
FIG. 8 shows the trained supervised machine learning module utilised for the automated identification of an accent type classification and an accent strength in accordance with an embodiment of the present disclosure.

Application of the Supervised Machine Learning Module 4 for Accent Recognition and Qualification of the Native Accent within the Second Language Turning now to FIG. 8, there is shown in exemplary scenario 65 illustrating the application of the trained supervised machine learning module 4 for accent recognition and quantification of the native accent within the second language.

Specifically, the trained system 4 is first applied to measure the rating 8 and the user background 80. The production score 8 can then be directly translated into accent strength wherein the better the score, the weaker the accent. The user background 80 is used to determine the accent type.

In other words, the trained system 4 can be utilised to measure the accent type and strength of a speech sample asset recording 7 wherein the production score 8 may be translated into accent strength wherein the better the score 8, the weaker the accent.

Automated Accent Recognition for Improved Speech Recognition

Now, as can be seen from FIG. 1, the system 1 may further comprise a speech recognition module 5. As will be described in further detail below, the accent type 67 and accent strength 68 determined by the trained supervised machine learning module 4 may be utilised for enhancing the accuracy of the speech recognition module 5.

Figure 9:
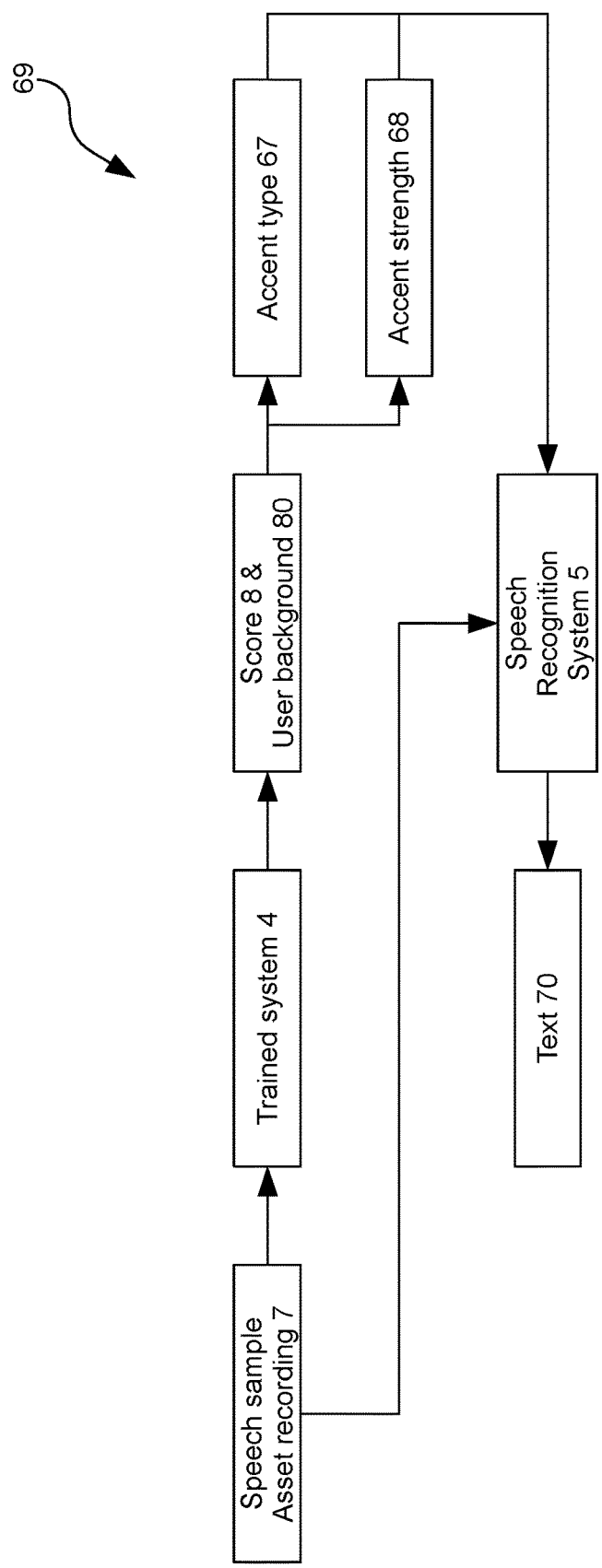
FIG. 9 shows the accent type classification being utilised for the improvement of a speech recognition system in accordance with an embodiment of the present disclosure.

Specifically, as illustrated from the exemplary scenario 69 of FIG. 9, the accent information determined by the supervised machine learning module 4 can provide improvements to speech recognition systems when applied to non-native speaker recordings.

As can be seen from the scenario, for a speech sample asset recording 7, that is fed into the trained system 4, the production score 8 and user background information 80 may be derived from which the accent type 67 and the accent strength 68 is determined which is then fed into the speech recognition system 5 for improving the accuracy of the generated text 70.

Differentiation can be made between "classical" and "modern" speech recognition systems. Classical systems are based on the so-called Hidden Markov Models (HMM), while the modern ones are based on artificial neural network and deep learning.

Application for Classical Speech Recognition Systems

Figure 10:
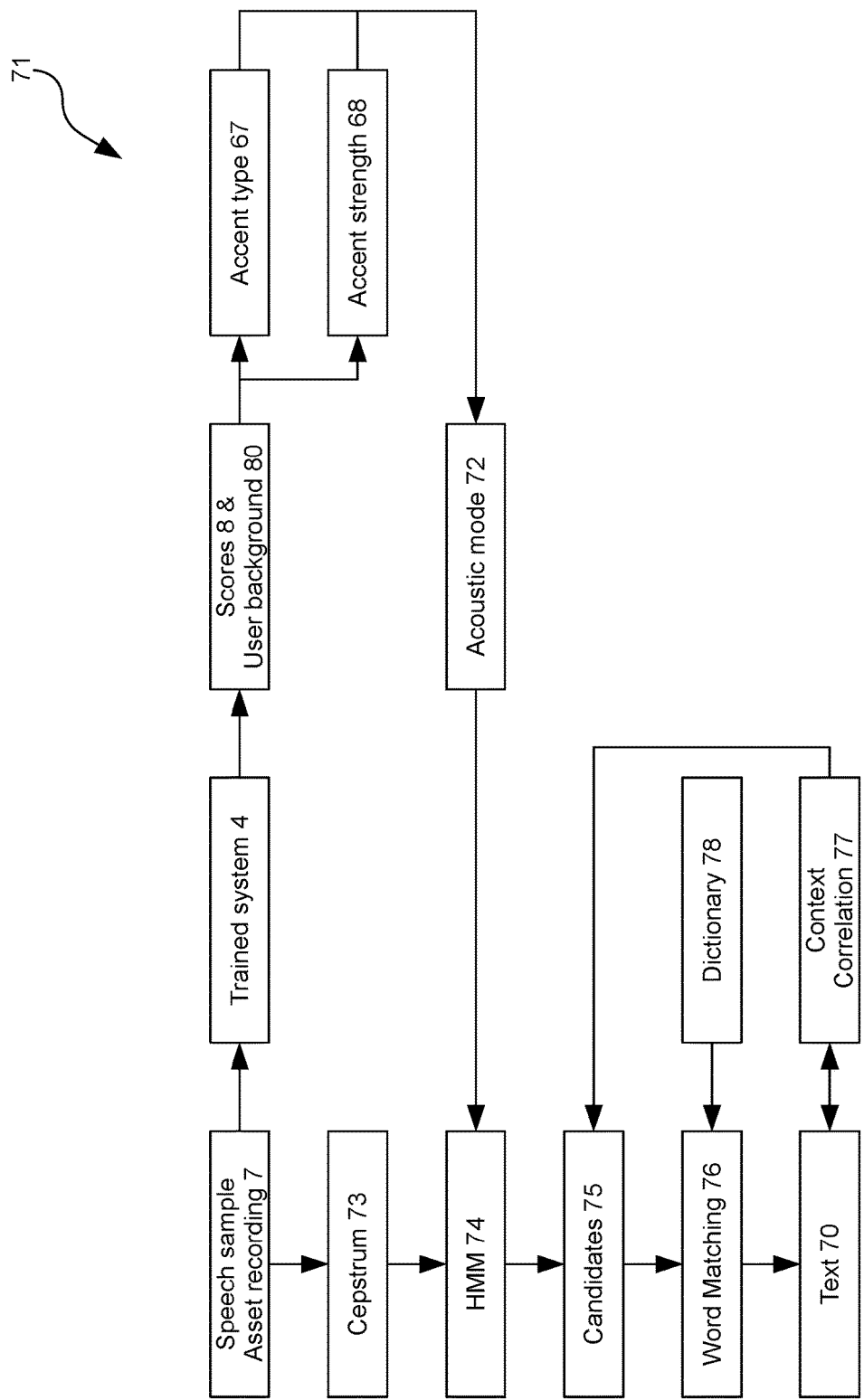
FIG. 10 shows the accent type classification being utilised for the selection of an acoustic model of the speech recognition system in accordance with an embodiment of the present disclosure.

Turning to FIG. 10, there is shown in exemplary use case scenario 71 of the utilisation of the detected accent type 67 and accent strength 68 in a classical speech recognition system.

In a classical system, the recorded speech is decomposed into "words", which can be words or short phrases. These words are then transformed into a cepstrum 73, which is a sequence of signals.

Using an acoustic model, the HMM 74 then proposes sequences of phonemes (sounds). These sequence are then matched to words (or phrases) 75 from the dictionary 78. The most likely suggestion is then selected. In advanced systems, a context correction 77 is applied, where the recognized word may be corrected to fit into the current context.

The accent recognition can help with the selection of the appropriate acoustic model 72. Specifically, the accent type 67 may be utilised to select the appropriate acoustic model. Furthermore, the detected accent strength 68 may be utilised to blend various acoustic models.

Consider the following example: In many languages, including the Slavic language group, there is no differentiation between short and long vowels. Thus, the words "lid" and "lead" are pronounced in a nearly the same fashion by native Russian speakers, while the native German speakers pronounce these two words differently. If the speech recognition system has the information that the speaker has a strong Russian accent, then the speech recognition system can choose an acoustic model, in which the phonemes corresponding to 'ea' in lead and 'i' in lid are similar or identical, so that the suggestions 'lead' and 'lid' obtain equal likelihoods. The differentiation between them can be done during context-based correction. If, on the other hand, the speech recognition system is informed that the speaker has a strong German accent, the suggestions 'lead' and 'lid' should receive different likelihoods.

Application for Modern Speech Recognition Systems

The state-of-the-art speech recognition systems are based on artificial neural networks and deep learning. These systems are typically trained using large numbers of native speaker recordings. It is hence not surprising that they often show mediocre performance when applied to recordings by second-language speakers.

Adding recordings of non-native speakers without further information during the training phase may have negative effects on the performance of such system. The features learnt for native speakers would be blurred by the various non-native pronunciation, and the accuracy for native speakers would become worse. If the number of non-native speaker recordings is low, these recordings will be marginalized and ignored by the artificial neural network due to their low overall contribution.

In this context, the accent recognition can be applied in two ways:
  a. 1. Use the output of the accent recognition system, together with the original recording, as input during the artificial neural network training phase. When applying the artificial neural network for speech recognition, use the output of the accent recognition system, together with the recording, as input.
  b. 2. Train different artificial neural networks for different accents. For speech recognition, select the appropriate artificial neural network based on the output of the accent recognition system.

Note that Approach 1 should ideally incorporate Approach 2 by assigning different parts (paths) in the network to different accents.

Figure 11:
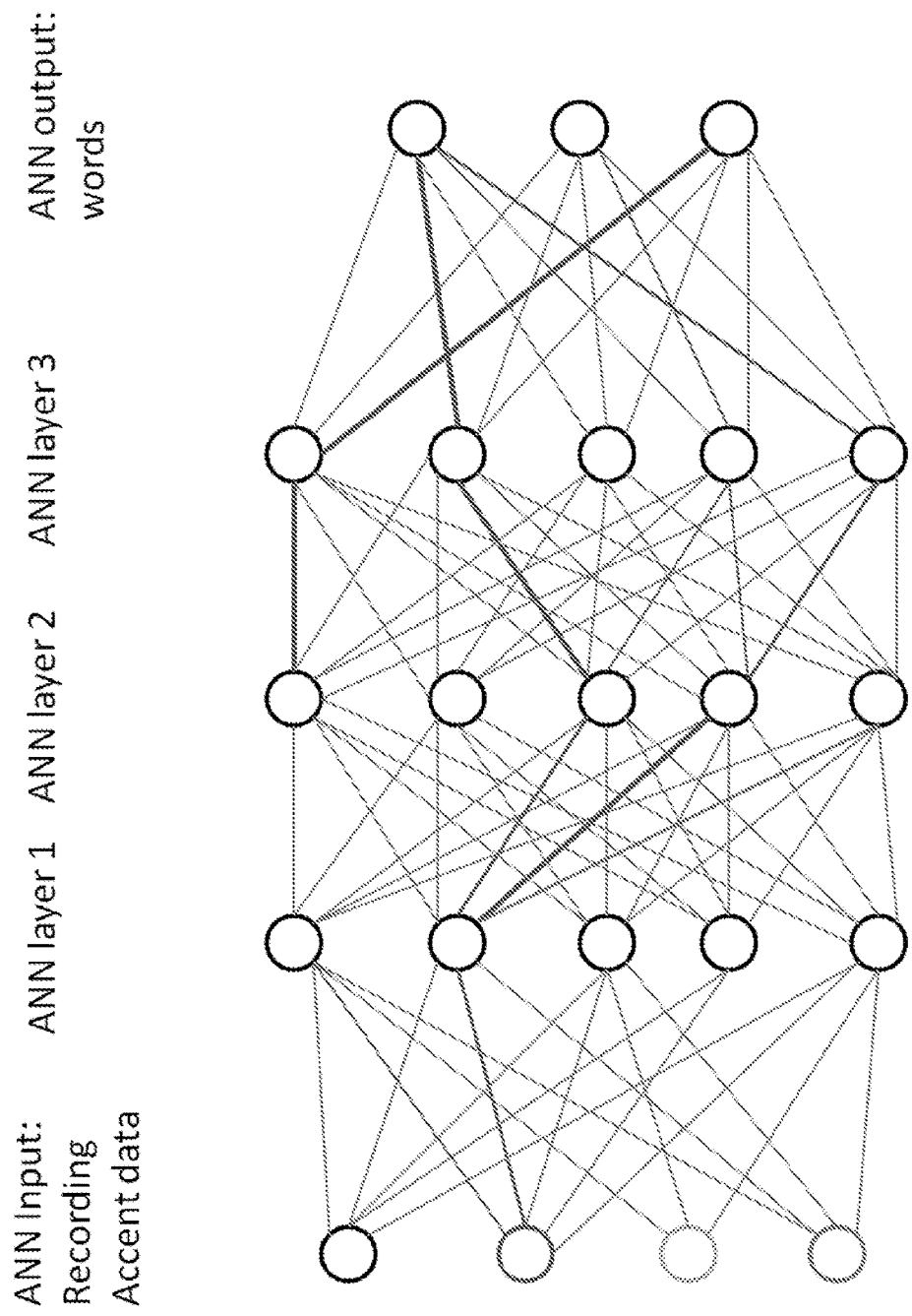
FIG. 11 shows an artificial neural network for speech recognition for different accents in accordance with an embodiment of the present disclosure.

For example, and referring now to FIG. 11, in an artificial neural network, there are layers. Each layer has a number of nodes. Each node in a layer is connected to each node in the neighbouring layer. The strength of each connection (weight) is learnt during the training process. When a network is trained, one can study the connections with large weights. These connections form the relevant part of the network. Sometimes, this relevant part has some sub-structures. One can take out such substructure from the network, keep the weights, and it will function as an autonomous artificial neural network.

In FIG. 11, an artificial neural network for speech recognition with different accents is shown. The input is the recording information, being the speech sample assets (in reality, many nodes), and the strength of the three accents (being the second, third and fourth inputs shown). Typically, one accent is strong (being the second input node), while the other two are weak (being the third and fourth inputs). The output is one of the 3 words in the dictionary.

As can be shown from the node weighed connections (shown in bold), a sub-structure can be identified from in the network. When removing all other connections, this sub-structure would work as a speech recognition system trained for the relevant accent (being the second input accent). Therefore, this substructure is implicitly embedded in the (larger) framework.

Exemplary Method for the Generation of Speech Sample Asset Production and Perception Scores for Users of a Distributed Language Learning System Now, having generally describe the above technical architecture and associated methodologies, there will now be described an exemplary method for the automated generation of speech sample asset production scores for users.

In a preferred embodiment, the production exercise comprises an emulation exercise wherein the user 15 is instructed to attempt to emulate as closely as possible the native speech sample asset.

For example, the user 15 may be required to listen to the native speech sample asset using the client terminal 13 and then, utilising the microphone of the client terminal 13, record an emulation of the native speech sample asset.

In embodiments, the production exercise may instruct the user 15 to attempt to emulate as closely as possible individual words or whole sentences.

It should be noted that, while in a preferred embodiment a native speech sample asset 7 is sent to the client terminal 13, in other embodiments and native speech sample asset 7 need not necessarily be utilised in lieu of, for example, displaying text on the screen of the client terminal 13 and instructing the users 15 to read from the text.

It should be noted that while emulation exercises are described herein with reference to the preferred embodiment, it should be noted that in other embodiments other production exercises may be performed. For example, the production exercise may comprise a comprehension exercise.

Now, for the embodiment wherein the user 15 is instructed to emulate the speech sample asset, the user 15 will record a recorded production speech sample asset 7, such as by utilising a microphone of the client terminal 13. As will be described in further detail below, the recorded speech sample asset is utilised for generating production scores wherein the recorded speech sample asset is rated by other users.

It should be noted that while in a preferred embodiment the users 15 record speech sample assets, in other embodiments the production exercises may be completed in other manners, such as by allowing the user 15 to input text, select from multiple-choice questions or the like.

However, in a preferred embodiment wherein the users 15 are instructed to record a recorded speech sample asset emulating the native speech sample asset, once completed, the client terminals 13 of the users 15 are adapted to send the recorded production speech sample assets 7 to the ranking module 2 (which may take the form of a server), which may be stored within the database 19.

Now, having received the recorded production speech sample assets, the speech sample ranking module 2 is adapted to send the recorded production speech sample assets to another user 15 for feedback.

Now, the other users 15 are instructed to perform a perception exercise to generate a production score of the recorded production speech sample assets.

Now, as can be appreciated, production score may be generated by users 15 in various manners.

In one embodiment, the user 15 receives recorded speech sample asset individually for providing feedback individually. For example, for each individually received speech sample asset, the user 15 may be instructed to provide a production score for the recorded speech sample asset in accordance with a production score scale, such as 1-5. In embodiments, the user 15 may be asked to rate the recorded speech sample asset in accordance with the number of metrics such as pronunciation, comprehension, intonation, accent and other qualitative metrics.

In a further embodiment, the user 15 is adapted to compare at least two recorded production speech sample assets.

As such, in this embodiment, the user 15 may be instructed to select which speech sample asset sounds better. For example, the user 15 may decide that the production speech sample asset 7 recorded by user 15 has better sounding French than the speech sample asset recorded by the other user 15. As such, the user 15 who is performing the perception exercise would make an appropriate selection.

In embodiments, the speech sample assets used may comprise native speaking speech sample assets also such that the user 15 may be instructed to guess which is the native speech sample asset.

Having performed the perception exercise, production scores 11 are recorded against the production speech sample asset 7 in the database 6.

The production scores may be provided to the users 15 who produces the relevant production speech sample assets 7.

For example, where the speech sample ranking module 2 is configured for the individual feedback scoring of recorded production speech sample assets, such individual production scores may be provided to the user 15. For example, a user 15 may receive an indication that the speech sample asset recorded by a user 15 received a production score of 3/5 and another user 15 may receive an indication that the speech sample asset recorded by the user 15 received a production score of 4/5.

In embodiments, the module 2 may be adapted to send a statistical derivative of the production scores to the user 15.

In further embodiments, where the speech sample ranking module 2 is configured for allowing the comparison of recorded production speech sample assets module 2 may be adapted to send a comparison metric to the user 15. For example, a user 15 may receive categorised feedback that the speech sample asset recorded by user 15 was deemed to be "average" or "good".

Now, in addition to providing the feedback to users, the speech sample ranking module 2 is configured for the purposes of generating perception scores 11 for users 15 performing perception exercises. As alluded to above, the speech sample ranking module 2 is adapted to identify those users who are good at providing feedback so as to, for example, be able to favour feedback received from those users.

As such, upon receipt of the production score 8 from the user 15, the rating updating module 36 may be adapted to calculate or generate a perception score 11 for the user 15 in accordance with the feedback generated by user 15.

In embodiments, the rating updating module 36 may be adapted to generate a perception score in accordance with a number of factors, such as consistency, accuracy and the like.

For consistency, the rating updating module 36 may calculate a consistency measure in isolation for user 15 or by comparing the production scores provided by user 15 with other users 15.

For example, the module 2 may be adapted to recycle recorded production speech sample assets for feedback by user 15 so as to ascertain whether user 15 consistently provides the same or similar feedback for the same recorded production speech sample assets. For example, if user 15 were to provide the same production score for recorded speech sample asset 7 on two consecutive occasions, the rating updating module 36 may allocate a higher consistency metric as opposed to were the feedback differed.

In this regard the speech sample ranking module 2 could implement "calibration exercises" that would consist of exercises that have been rated by an expert user 15 or a native speaker 16 and which would be used to evaluate user 15. Importantly, for example, if user 15 is good at rating the rolling "R" in Spanish, the speech sample ranking module 2 would still need to record separately how user 15 rates the "j" sound in Spanish. So user 15 would be evaluated on the whole panel of difficulties presented by the Spanish language. Therefore the speech sample ranking module 2 could aggregate that data to provide higher level feedback too such that, for example, user 15 is good with vowels but not so good with consonants, or user 15 is good with words in isolation but not so good with connected speech, etc.

In other embodiments, the speech sample ranking module 2 may compare user 15 against other users. For example, should user 15 provide a low production score for a recorded speech sample asset whereas the majority of other users 15 provided a high production score the rating updating module 36 may allocate a low accuracy metric for user 15.

In embodiments, the rating updating module 36 may employ statistical modelling for the purposes of ascertaining consistency, accuracy and the like. For example, the scoring module may employ bell shaped curve fitting to calculate accuracy and consistency for the user 15.

Exemplary Method for the Automated Generation of Speech Sample Asset Production Scores for Users of a Distributed Language Learning System Now, having produced the above production scores 8 and perception scores 11, there will now be described in exemplary method for the automated generation of speech sample asset production scores 8.

In these embodiments, the system 1 may automate the generation of the speech sample production scores 8, either in the first instance, or by way of update. Specifically, in these embodiments, the system 1 utilises the supervised machine learning module 4 for the automated generation of the speech sample asset production scores.

Figure 6:
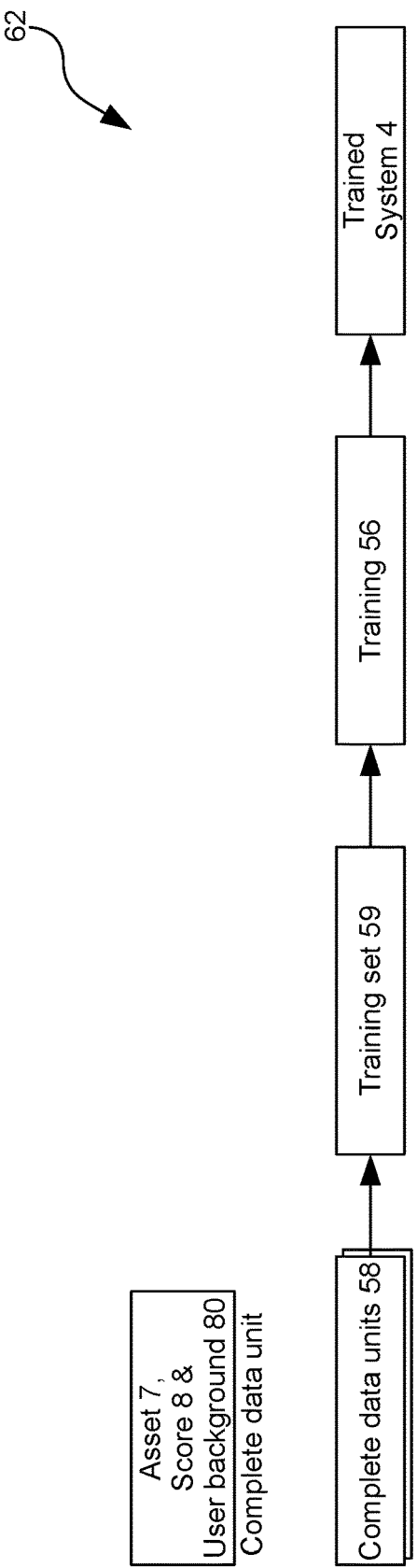
FIG. 6 shows the training of the supervised machine learning module in accordance with an embodiment of the present disclosure.

Specifically, and as alluded to above with reference to FIG. 6, in this embodiment, the method comprises training the supervised machine learning module 4. Such training may comprise generating a training set comprising a plurality of data units. As can be seen from FIG. 6, the data units may comprise the speech sample asset 7, the speech sample asset production score 8 and user background information 80.

These plurality of data units form the training set 59 which are utilised by the training module 56 to train the supervised machine learning module 4 to generate a trained supervised machine learning module 4.

Figure 7:
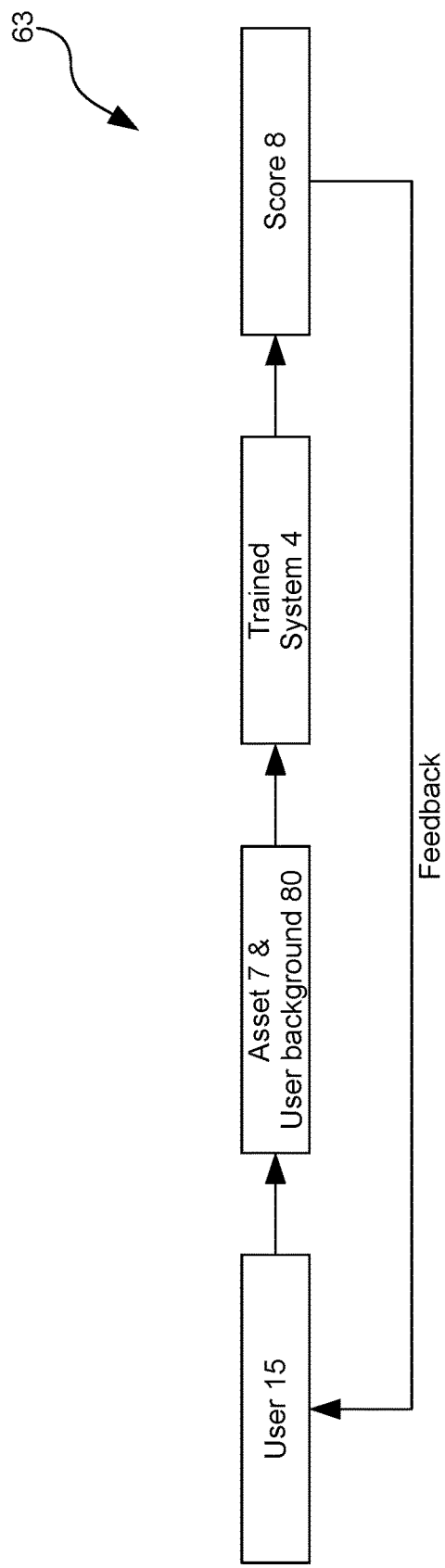
FIG. 7 shows the trained supervised machine learning module utilised for the automated generation of speech sample asset production scores in accordance with an embodiment of the present disclosure.

As such, and with reference to FIG. 7, for a candidate speech sample asset 7 of a user 15 and associated user background 80, the speech sample asset and the user background 80 may be fed into the trained system 4 such that the speech sample asset production score 8 may be generated from the trained system.

Specifically, the method may entail for a plurality of speech sample assets 7 comprising native speech sample assets; sending the native speech sample assets to a plurality of non-native speaker users 17 to perform production exercises and receiving production speech sample assets 7 generated by the production exercises.

The method may then entail sending the production speech sample assets to a plurality of users to perform perception exercises and receiving production scores 8 generated by the perception exercises.

The method then entails training the supervised machine learning module 4 comprising generating a training set 59 comprising the production speech sample assets 7 and the associated production scores 8 and associated user background information 80 of the first plurality of non-native speaker users and training the supervised machine learning module utilising the training set 59 to generate a trained supervised machine learning module 4.

As such, for a candidate production speech sample asset 7 of a non-native speaker user 15, inputting the candidate production speech sample asset 7 and user background information of the non-native speaker user into the trained supervised machine learning module may generate a speech sample asset production score 8 for the candidate production speech sample asset in an automated manner.

Exemplary Method for Automated Accent Recognition and Quantification

Now, having generated the speech sample asset production score 8 in an automated manner as described above, the automatically generated speech sample asset production score may be utilised for automated accent recognition and quantification.

Specifically, turning to FIG. 8, there is shown a speech sample asset recording 7 fed into the trained system 4 and wherein the trained system 4 is utilised for the automated generation of the speech sample asset production score 8 and user background information 80.

In this manner, the user background information (such as country of origin) may be translated into an accent type category, such as an Indian, French or Spanish accent categorisation.

Furthermore, the speech sample asset production score may be directly translated into an accent strength 68.

Exemplary Method for Improved Speech Recognition

Now, in a further embodiment, having automated the generation of the accent type 67 and accent strength 68 utilising the trained supervised machine learning module 4, the accent type 67 and accent strength 68 may be utilised for improved speech recognition.

Specifically, turning to FIG. 10, the generated accent type 67 may be utilised for the selection of an appropriate acoustic model 72 for the speech recognition.

In embodiments, the accent strength 68 may be utilised for the blending of a plurality of acoustic models 72.

Interpretation

Production Exercise:

The term "production exercise" referred to herein should be construed generally as any activity producing a recorded sample, especially an audio sample, but also including video samples. In a specific embodiment, the production exercise comprises generating a speech sample asset utilising recording apparatus such as a microphone, usually by a user 15 following instructions of a speech exercise.

Perception Exercise

The term "perception exercise" referred to herein should be construed generally as any activity where a person perceives a recorded sample, especially an audio sample but also including video samples. In a specific embodiment, a perception exercise comprises a user, such as a user 15, perception to a recorded speech sample asset. The perception exercise may further comprise the user inputting data representing the user's perception.

In one embodiment, the perception exercise may comprise the user comparing two speech sample assets and providing feedback as to which speech sample asset is perceived by the user as being most correct/accurate.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. A method for improved speech recognition of non-native speaker speech, the method comprising:
   for a plurality of speech sample assets comprising native speech sample assets;
   sending the native speech sample assets to a plurality of non-native speaker users to perform production exercises;
   receiving production speech sample assets generated by the production exercises;
   sending the production speech sample assets to a plurality of users to perform perception exercises;
   receiving production scores generated by the perception exercises;
   training a supervised machine learning module comprising:
      generating a training set comprising:
         the production speech sample assets,
         the associated production scores; and
         associated user background information of the plurality of non-native speaker users; and
      training the supervised machine learning module utilising the training set to generate a trained supervised machine learning module; and
      for a candidate production speech sample asset of a non-native speaker user:
         inputting the candidate production speech sample asset into the trained supervised machine learning module to recognise user background information of the non-native speaker user;
         categorising the user background information into an accent type category;
         selecting an acoustic model for a speech recognition module in accordance with the accent type category; and
         recognising speech of the candidate production speech sample asset using the speech recognition module.

2. A method as claimed in claim 1, wherein the production exercises comprise at least one of a word and sentence emulation production exercise.

3. A method as claimed in claim 1, wherein the production exercises comprise a comprehension exercise.

4. A method as claimed in claim 1, wherein the perception exercises comprise rating the recorded speech sample in accordance with a feedback scale.

5. A method as claimed in claim 1, wherein the trained supervised machine learning module uses regression for the generation of the speech sample asset production score.

6. A method as claimed in claim 1, wherein the trained supervised machine learning module uses classification for the generation of the user background information.

7. A method as claimed in claim 1, wherein user background information comprises at least one of native language and geographic area comprising at least one of country of origin and country of residence.

8. A method as claimed in claim 1, wherein the speech recognition module is a Hidden Markov Model speech recognition module.

9. A method as claimed in claim 1, further comprising training the speech recognition module in accordance with the accent type category and the candidate production speech sample asset.

10. A method as claimed in claim 9, wherein the speech recognition module is an artificial neural network speech recognition module.

11. A method as claimed in claim 10, wherein the artificial neural network speech recognition module comprises separate neural networks for each type of accent type category.

12. A method as claimed in claim 10, wherein the artificial neural network speech recognition module comprises a neural network and wherein the neural network comprises differing paths for each type of accent type category.

13. A method as claimed in claim 1, further comprising:
training a plurality of speech recognition modules in accordance with a respective plurality of accents and selecting one of the plurality of speech recognition modules in accordance with the accent type category.

14. A method as claimed in claim 13, wherein the speech recognition module is an artificial neural network speech recognition module.

15. A method as claimed in claim 1, further comprising:
inputting the candidate production speech sample asset into the trained supervised machine learning module to generate:
a speech sample asset production score
translating the speech sample asset production score to an accent strength; and
selecting a plurality of acoustic models for the speech recognition module in accordance with the accent type strength.

* * * * *